United States Patent Office 3,491,677
Patented Jan. 27, 1970

3,491,677
ANTIBLOOM CHOCOLATE COMPOSITION AND METHOD FOR PRODUCING IT
Umberto Bracco, La Tour-de-Peilz, Switzerland, assignor to Afico S.A., Lausanne, Switzerland, a company of Switzerland
No Drawing. Filed Jan. 25, 1966, Ser. No. 522,843
Claims priority, application Switzerland, Feb. 3, 1965, 1,481/65
Int. Cl. A23g 1/00
U.S. Cl. 99—23                5 Claims

ABSTRACT OF THE DISCLOSURE

A method of inhibiting fat bloom in chocolate products involving the utilization of a fatty composition consisting essentially of a mixture of natural interesterified triglycerides comprising 40% to 60% of short chain fatty acids containing up to 14 carbon atom content per molecule and 60% to 40% long chain fatty acids containing more than 14 carbon atom content per molecule, the mixture having a melting range from 22° C. to 35° C. and an iodine index of 30 to 55.

---

The present invention is concerned with a fatty composition useful as an anti-bloom agent for chocolate products.

Fat bloom in chocolate is a whitening of the surface of articles such as bar chocolate or bonbons. This effect is unrelated to the age of the chocolate and does not affect the flavour of the article but nevertheless chocolate articles on which bloom has appeared are viewed with suspicion by the consumers.

Fat bloom occurs both in plain and milk chocolates, plain and milk coatings used for enrobing various centres, both fatty (praliné, nougat) and moist (marzipan, fondant), as well as in milk or plain chocolates containing sugars other than sucrose such as dextrose or invert sugar. The white layer which appears on the surface of these articles consists of cocoa butter or, more specifically, a certain fraction of the cocoa butter which migrates under the influence of different factors and solidifies on the surface of the article in more or less large crystals, thus producing the fat bloom. Fat bloom differs from other types of bloom, such as sugar bloom, which is less frequently found in chocolate manufacture.

The causes of fat bloom are to be found in the cocoa butter itself, that is in its crystal structure at the time of moulding or enrobing, as well as in the conditions under which the chocolate articles have been stored. An improper tempering of the chocolate (accompanied by the formation of unstable crystal structures) and repeated temperature changes during storage are particularly conducive to the formation of fat bloom. Furthermore, the centres of filled or enrobed chocolate articles may also have an influence on the formation of fat bloom, notably their fat content, composition and temperature of coating. Finally, it should be noted that proper tempering, followed by storage under ideal conditions, will not prevent the formation of fat bloom but rather delay its on-set.

In the present specification, the term "fat bloom" is intended to mean migration of the mono-unsaturated triglyceride fraction of cocoa butter to the surface of the chocolate article, this fraction being carried by the di-unsaturated fraction at the temperatures obtaining in the manufacture of chocolate and confectionery. Fat bloom is closely bound with the triglyceridic character of cocoa butter, and especially with its calorimetric and dilatometric properties.

The present invention provides a fatty composition consisting essentially of a mixture of interesterified triglycerides comprising 40 to 60% of short chain fatty acids and 60 to 40% of long chain fatty acids, said mixture having a melting range from 22° C. to 35° C. and an iodine index of 30 to 55.

The terms "short chain fatty acids" and "long chain fatty acids" are used herein in their conventional sense, that is short chain fatty acids are those containing up to 14 carbon atoms per molecule and long chain fatty acids are those containing more than 14 carbon atoms per molecule.

A feature of the present invention is a chocolate containing the composition defined above, preferably in an amount corresponding to from 0.5 to 5.0% by weight of the chocolate.

The composition according to the present invention may be prepared by conventional methods, for example by interesterification of short chain fatty acid triglycerides with long chain fatty acid triglycerides. Thus, the composition may advantageously be prepared by even interesterification at low temperature, for example at 25 to 35° C., or by random interesterification at higher temperatures such as 90 to 110° C. It is desirable to employ a conventional interesterification catalyst, for example an alkali metal alkoxide or stannous chloride; sodium methoxide is the preferred catalyst.

Fatty acid triglycerides of animal and vegetable origin may be used as starting materials in the preparation of the composition according to the present invention. As source of long chain fatty acid triglycerides there may be used, for example, ground nut oil, soya bean oil, cottonseed oil or sunflower oil, either singly or in any desired combination. Coconut oil, palm kernel oil or babassu oil may be employed as sources of short chain fatty acid triglycerides. Hydrogenated oils and mixtures of oils may also be used.

Upon completion of the interesterification reaction, the catalyst, when used, may be destroyed and the product recovered by conventional techniques. In some cases it may be desirable to fractionate the triglyceride mixture in order to isolate that component which has the properties stated above.

As indicated above, the composition according to the invention may be incorporated in various chocolate masses at a level of 0.5 to 5.0% by weight of the chocolate. Examples of chocolate masses to which the composition may with advantage be added are plain and milk chocolate, in the form of tablets or bars, coatings, bonbons and chocolate confectionery articles. Chocolate articles containing up to 5% of the anti-bloom agent according to the present invention retain a high gloss even after prolonged storage, that is 9 months and more, whereas conventional chocolate articles stored under identical conditions for similar periods were completely covered with fat bloom.

Cycle tests were also carried out, in which the chocolate sample is subjected to conditions which are very favourable towards the formation of fat bloom. In such tests, the temperature of the sample is varied during a 24-hour cycle. In a typical test, in which the chocolate is exposed to conditions rapidly provoking the formation of bloom, one cycle may comprise a period of 14 hours at 15° C. followed by 10 hours at 30° C. Chocolates (bonbons) enrobed with a chocolate coating incorporating the composition according to the invention were highly resistant to the formation of fat bloom and retained a high gloss after 38 cycles.

The following examples, in which all parts are parts by weight, are given for the purposes of illustration only:

Example 1

30 parts of refined coconut oil (ffa=0.09; unsap.= 0.29) and 70 parts of hydrogenated groundnut oil (ffa= 0.10; m.p.=3.45–35.6° C.) are heated at 120° C. under reduced pressure (3 mm.) for 10 minutes thereby to reduce the water content to 0.01%. The dehydrated mixture is cooled to 34° C. 0.2% of sodium methoxide as catalyst are added and even interesterification is carried out under usual conditions. The solid fraction is then recovered, the catalyst is destroyed by adding dilute acetic acid and the fatty composition is washed, centrifuged and dried.

A homogeneous mixture of triglycerides is thus obtained, which has a broad melting range and is free from polymorphic transformations and hence its dilation curve remains unchanged before the dilation associated with melting. The composition is plastic, is completely soluble in cocoa butter and possesses the following chemical indices: iodine: 51.9; saponification: 208.7; Reichert Meissl: 2; $n_D^{4°}$s 1.4570; Polenske: 5.4; Ind. A: 9.1; Ind. B: 0.7.

Example 2

70 parts of hydrogenated coconut oil (M.P.=31–32° C.), 5 parts of refined cocoa fat, 10 parts of hydrogenated soya bean oil and 15 parts of sunflower oil are mixed, dried under vacuum and interesterified at 90° C. during 1 hour in the presence of 0.2% sodium methoxide as interesterification catalyst. Upon completion of the reaction, the catalyst is destroyed as described in Example 1 and the fat is washed, centrifuged and refined in usual manner.

The resulting product has the following fatty acid composition: $C_8$: 4.20%; $C_{10}$: 3.61%; $C_{12}$: 28.8%; $C_{14}$: 13.4%; $C_{16}$: 9.57%; $C_{18}$: 13.67%; $C_{18}$: 16.50%; $C_{18}$: 10.25%.

Example 3

A conventional dark (plain) chocolate is prepared except that 2% of the cocoa butter are replaced when the viscosity is being adjusted, by an equal quantity of a fatty composition prepared as described in Example 1. This mass is then tempered and moulded in usual manner. A part of the moulded articles is stored at 15° C., 20° C., 25° C. and at ambient temperature. A second part is subjected to a series of cycle tests (14 hours at 15° C.— 10 hours at 30° C.). A parallel series of tests (storage and cycle) is also carried out on a similar batch of chocolate containing no anti-bloom agent, all the fat present in this bath being cocoa butter.

In all tests, the chocolates containing the composition prepared as described in Example 1 retained a high gloss after prolonged storage (6–12 months). After 38 complete cycles at 15° C. and 30° C., the untreated chocolates were completely covered with bloom whereas the chocolates with anti-bloom agent were glossy all over.

Example 4

2% of a composition prepared as described in Example 1 are incorporated in a plain coating chocolate and, after tempering, the mass is used for coating fatty centres (praline) and moist centres (marzipan). A second coating mass having the same fat content and viscosity is prepared under identical conditions but without addition of anti-bloom agent.

Storage tests show that the coating chocolate containing 2% of anti-bloom agent retains its gloss whereas the control sample without addition is covered with fat bloom.

Example 5

Plain (dark) and milk coating chocolates are prepared in which a portion of the sucrose is replaced by amorphous sugar and 2% of the cocoa butter by an equal amount of the composition prepared as described in Example 1. Bonbons with fatty and moist centres were prepared, enrobed with said coatings. Control samples of coating were also prepared, having the same ratio of amorphous sugar to crystallised sugar but without addition of anti-bloom agent. All these products were submitted to a series of cycle tests (14 hours at 15° C.— 10 hours at 30° C.) which showed that after 18 cycles the control samples were covered with bloom whereas the coatings containing the anti-bloom agent according to the present invention remained glossy. Similar results were obtained when 5% of the cocoa butter were replaced by the composition prepared as described in Example 2.

Example 6

A series of chocolates was prepared as described in Example 3 except that 5% of the composition prepared as described in Example 2 were used as anti-bloom agent.

The results of storage tests were similar to those set out in Example 3.

Example 7

A quantity of chocolate coating such as described in Example 4 was prepared, 5% of the cocoa butter being replaced by an equal amount of the composition prepared as described in Example 2. After prolonged storage at temperatures between 15 and 30° C. this coating had retained its gloss over all of its surface whereas a control sample of a similar coating not containing anti-bloom agent was covered with bloom. Similar results were obtained after 35 complete 24 hour cycles.

I claim:

1. A chocolate product containing as an anti-bloom agent from about .5 to 5% based on the weight of the chocolate in the product of a fatty composition consisting essentially of a mixture of interesterified triglycerides comprising 40 to 60% of short chain fatty acids and 60 to 40% of long chain fatty acids said mixture having a melting range from 22° C. to 35° C. and an iodine index of 30 to 55.

2. A process for inhibiting fat bloom in chocolate products which comprises incorporating into the chocolate of said products from .5 to 5% based on the weight of the chocolate in said product of a composition prepared by interesterifying a mixture containing 40 to 60% short chain fatty acid triglycerides and 60 to 40% long chain fatty acid triglycerides and having a melting range from 22° C. to 35° C. and an iodine index of 30 to 55.

3. A process according to claim 2 in which at least one of the following substances namely coconut oil, palm kernel oil and babassu oil is used as source of short chain fatty acid triglycerides.

4. A process according to claim 2 in which at least one of the following substances namely ground nut oil, soya bean oil, cottonseed oil and sunflower oil is used as source of long chain fatty acid triglycerides.

5. A chocolate product in accordance with claim 1 containing cocoa butter wherein the anti-bloom agent replaces an equivalent percentage of cocoa butter in the chocolate of said product.

References Cited

UNITED STATES PATENTS

| | | | |
|---|---|---|---|
| 2,859,119 | 11/1958 | Cochran et al. | 99—118 |
| 2,892,721 | 6/1959 | Nelson | 99—118 |
| 2,979,407 | 4/1961 | Duck | 99—23 |
| 3,361,568 | 1/1968 | Kidger | 99—23 |

MAURICE W. GREENSTEIN, Primary Examiner

U.S. Cl. X.R.

99—118